US008589555B2

(12) United States Patent
Chen et al.

(10) Patent No.: US 8,589,555 B2
(45) Date of Patent: Nov. 19, 2013

(54) VIRTUALIZATION AND CONSOLIDATION ANALYSIS ENGINE FOR ENTERPRISE DATA CENTERS

(75) Inventors: Haifeng Chen, Old Bridge, NJ (US); Guofei Jiang, Princeton, NJ (US); Kenji Yoshihira, Princeton Junction, NJ (US); Akhilesh Saxena, Morristown, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 391 days.

(21) Appl. No.: 12/940,134

(22) Filed: Nov. 5, 2010

(65) Prior Publication Data

US 2011/0173327 A1   Jul. 14, 2011

Related U.S. Application Data

(60) Provisional application No. 61/293,865, filed on Jan. 11, 2010.

(51) Int. Cl.
*G06F 15/16* (2006.01)

(52) U.S. Cl.
USPC ............................ 709/226; 717/176; 709/219

(58) Field of Classification Search
USPC ......................................................... 709/226
See application file for complete search history.

(56) References Cited

U.S. PATENT DOCUMENTS

| | | | |
|---|---|---|---|
| 2007/0255814 A1* | 11/2007 | Green et al. | 709/223 |
| 2009/0271498 A1* | 10/2009 | Cable | 709/219 |
| 2010/0192156 A1* | 7/2010 | Hollingsworth | 718/104 |
| 2011/0107327 A1* | 5/2011 | Barkie et al. | 717/176 |

* cited by examiner

*Primary Examiner* — Hamza Algibhah
(74) *Attorney, Agent, or Firm* — Joseph Kolodka

(57) ABSTRACT

A method and apparatus for consolidating a plurality of applications into one or more servers. The method and apparatus organizes consolidation constraints representing preferences about placing applications into the one or more servers, and allocates the applications into the one or more servers in a manner that maximally satisfies the consolidation constraints.

19 Claims, 8 Drawing Sheets

VIRTUALIZATION AND CONSOLIDATION ANALYSIS ENGINE FOR ENTERPRISE DATA CENTERS

RELATED APPLICATIONS

This application claims the benefit of U.S. Provisional Application No. 61/293,865, filed Jan. 11, 2010, the entire disclosure of which is incorporated herein by reference.

FIELD

The present disclosure relates to information technology. More specifically, the present disclosure relates to server consolidation.

BACKGROUND

Server consolidation is becoming one of the top priorities for many IT departments because the traditional way of dedicating one server to a single application will leave many servers under-utilized for most of the time. By aggregating workloads from separate machines into a small number of servers, we can boost the resource utilization rate, which in consequence save the power and space for enterprise data centers. With the recent resurgence of virtualization technology, the server consolidation can now be achieved by hosting multiple virtual machines (VM) in one physical machine, each of which encapsulates one application separately. The virtualization provides an abstract layer between the operating system and the hardware, which enables multiple VMs to share the same physical machine fairly with the minimum impact of system performance.

While server consolidation through virtualization brings a lot of advantages, some of the benefits are offset by the added system management complexity introduced by the consolidation. Instead of managing numerous physical machines, administrators are now facing a large number of virtual machines concentrated in a much dense, complex, and shared environment, in which the impacts of hardware failures, human errors, and security breaches can be vastly magnified. For example, any situation that requires a physical server re-boot, such as the hardware failure or system maintenance, will affect all the virtual machines in that physical machine rather than a single application. Similarly, the increased sharing of hardware by multiple applications may enhance the possibilities of revealing sensitive information to potential adversarial applications, which will compromise the security and privacy requirements of the system.

Accordingly, a method and an apparatus are needed to achieve server consolidation under multiple constraints.

SUMMARY

A method is disclosed for consolidating a plurality of applications into one or more servers. The method comprises organizing consolidation constraints representing preferences about placing applications into the one or more servers, and allocating the applications into the one or more servers in a manner that maximally satisfies the consolidation constraints.

Also disclosed is an apparatus for consolidating a plurality of applications into one or more servers. The apparatus comprises a processor that executes instructions for organizing consolidation constraints representing preferences about placing applications into the one or more servers, and allocating the applications into the one or more servers in a manner that maximally satisfies the consolidation constraints.

DETAILED DESCRIPTION

Figure 1:
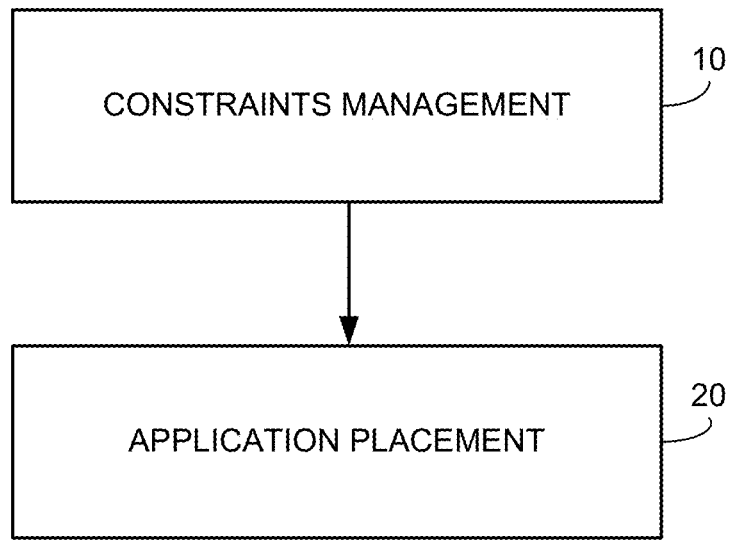
FIG. 1 is a high level flowchart of a virtualization and consolidation analysis engine or method of the present disclosure for achieving server consolidation under multiple constraints.

Server consolidation through virtualization creates an opportunity to fully utilize system resources, reduce IT costs, and save energy and space for enterprises. But it also poses new challenges and potential risks for the consolidated system. For example, an inappropriate placement of one application may cause the service disruption of all other applications collocated in the physical machine. In order to avoid those risks, a careful plan is needed before the consolidation, which should consider various perspectives of the system including without limitation performance, maintenance, security, and business perspectives of the system. Each of these considerations is regarded as a quality factor or constraint which must be managed, i.e., organized and processed, in the server consolidation to achieve high quality results.

Memory Sharing Constraints

Many virtual machine monitors have a content-based-memory-sharing feature to share duplicated copies of memory page between virtual machines (VMs) resident in the same physical machine. In order to increase the memory utilization in the consolidated system, it is better to allocate applications (each of which is encapsulated by a VM) with many duplicated memory pages into the same machine.

Network Constraints

There are several network related constraints because it is important to have a consolidated environment in which the network communications between applications are disrupted as little as possible. For example, the allocation of two network intensive applications into the same machine can be avoided due to the following two reasons: 1) the coexistence of two network intensive VMs in one physical machine will lead to performance interferences between VMs; 2) by evenly distributing network intensive applications in the system, the network traffic can be balanced and reduce the possibility of network bottlenecks.

Correlation Awareness Constraints

One benefit of consolidation arises from the fact that it allows the resource multiplexing between co-hosted applications in the physical machine. As a result, the resource usages in each machine can be optimized. However, if two applications having correlated resource utilizations are collocated in the same machine, the benefit of resource multiplexing cannot be fully utilized. In the consolidation process, those applications must be separated into different machines.

Synchronized Peak Load Avoidance Constraints

In the shared consolidation environment, the resource overbooking for each application can maximize the platform yield in terms of utilized resources. That is, rather than using the maximum resource usage of each application as its resource demand, some overbooking tolerances can be had, e.g., using the 99 percentile of utilization as the resource demand, to guide the application placement. However, in order to take such an advantage, applications that have synchronized peak loads need to be separated into different machines. Otherwise, those applications may exhibit performance problems due to the frequent violations of their overbooking tolerances.

Security and Privacy Constraints

While current virtualization products provide powerful security mechanisms inside, there still exist possibilities to compromise the hypervisor, which in consequence exposes all user domains to malicious insiders. Such possibilities give rises to stringent requirements of application isolation and software integrity. For example, government regulations may require an investment bank to maintain a strict separation between its market analysis and security underwriting department, including their respective information processing facilities. Similarly, some privacy requirements need to ensure that two applications containing conflicting information should be separated into different physical machines.

Maintenance Constraints

In the consolidated environment, any situation that requires a physical server reboot will affect all VMs in that machine. Therefore, it is necessary to combine applications with overlapping maintenance windows into one physical host, so that the impacts of hardware maintenance in the consolidated system can be mitigated.

Business Constraints

There are also a lot of non-technical considerations that govern the operation of a consolidated IT environment. For example, some applications can be allocated together, such as those financial processing software, in order to facilitate the management. On the other hand, some applications that serve different customers need to be separated due to contractual obligations.

There are many other constraints that will affect the outcome of server consolidation, including without limitation, fault tolerance and power line redundancy. In the present disclosure, the large number of constraints are effectively utilized in server consolidation. That is, a consolidation solution is found that requires as few machines as possible, while maximally satisfying the specified constraints FIG. 1 is a high level flowchart of a virtualization and consolidation analysis engine or method of the present disclosure for achieving server consolidation under multiple constraints. The method generally performs two processes: constraints management 10 and application placement 20. The constraints management process concentrates on the effective handling of various consolidation constraints. The application placement process allocates applications in an optimal way under the constraints. As a result, a consolidation solution can be obtained that not only requires a minimum amount of resources to host applications, but also maximally satisfies the existing constraints.

The constraints management process discovers, represents, checks, and combines all constraints in the server consolidation. It not only accepts human specified constraints, but also automatically discover constraints from system resource log and configuration files. For example, the constraint management process can analyze applications' historical resource usages to identify the application pairs that frequently show concurrent peaks in their resource utilizations. Those application pairs need to be separated during the consolidation. Similarly, many other constraints can also be described by the relationship between applications, i.e., whether they are preferred to be collocated or separated in the physical machine. Therefore, an affinity matrix is used to represent each constraint, in which each entry reflects the preference of collocating the related application pair into the same physical server. Based on the value of matrix entries, the affinity matrices are further classified into multiple types: e.g., "must be", "should not be," and "can be" matrices. While the "must be" and "should not be" matrices specify that two applications must be or should not be located in the same machine, the "can be" matrices provide soft preferences of application placement. In the consolidation process, the "must be" and "should not be" constraints must be followed, whereas the "can be" constraints need to be satisfied with the best effort based on the degrees of preferences described in the affinity matrices.

In order to efficiently utilize the large number of constraints, the constraint management process provides a constraints fusion process for each type of affinity matrices. The fusion of "must be" or "should not be" matrices is straightforward because those hard constraints have to be all satisfied in the combined output. For the "can be" constraints, the method uses a weighted average to combine those matrices. The weights for the combination are carefully chosen in the method to highlight those strong preferences in the original constraints, as well as to differentiate various constraints in the fusion. As a result, the combined "can be" matrix can preserve all important information from the initial matrices.

The application placement process of the method places the applications into physical machines guided by the consolidation constraints. It is known that the application placement is a NP-hard problem and usually relies on heuristic methods to find the near optimal solution. However, current heuristics used in application placement are mainly designed for the minimization of hosting machines, which have not considered the satisfaction of constraints during the consolidation. In order to automate the design of more effective heuristics, one embodiment of the application placement process uses an evolution based algorithm to identify the optimal application placement under the constraints. The algorithm develops a number of evolutionary operators, such as the mutation, recombination, and selection to update each population of placement solutions. As a result, the qualities of population always get improved, and the evolutionary process will eventually converge to the optimal placement solution.

The search space of application placement exponentially increases with the number of applications. In order to make the placement search scale well with the number of applications, one embodiment of the application placement process provides an application grouping mechanism prior to the application placement. In this embodiment, the application placement process clusters the applications into a number of groups, and performs the placement search in each application group separately. As a result, the efficiency of the evolution based placement algorithm can be significantly improved. Such advantage is especially valuable when the number of applications involved in the consolidation is large.

Constraints Management

Figure 2B:
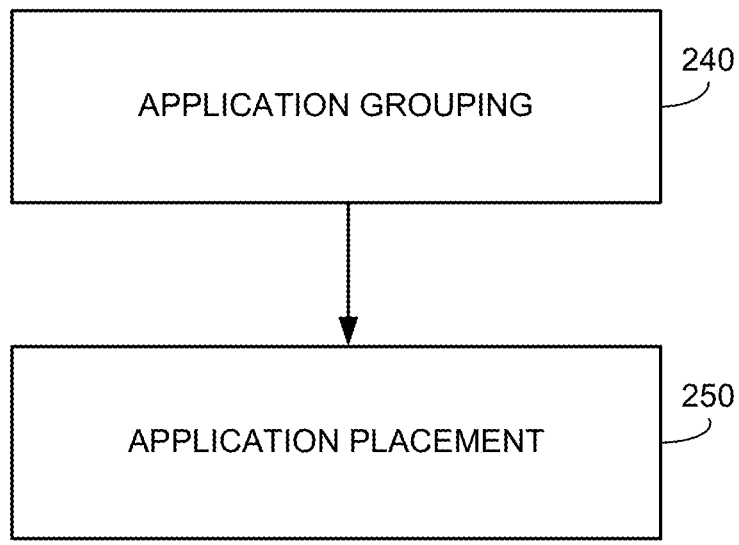
FIG. 2B is a flow chart of the application placement process of the method, according to an exemplary embodiment of the present disclosure.
Figure 2A:
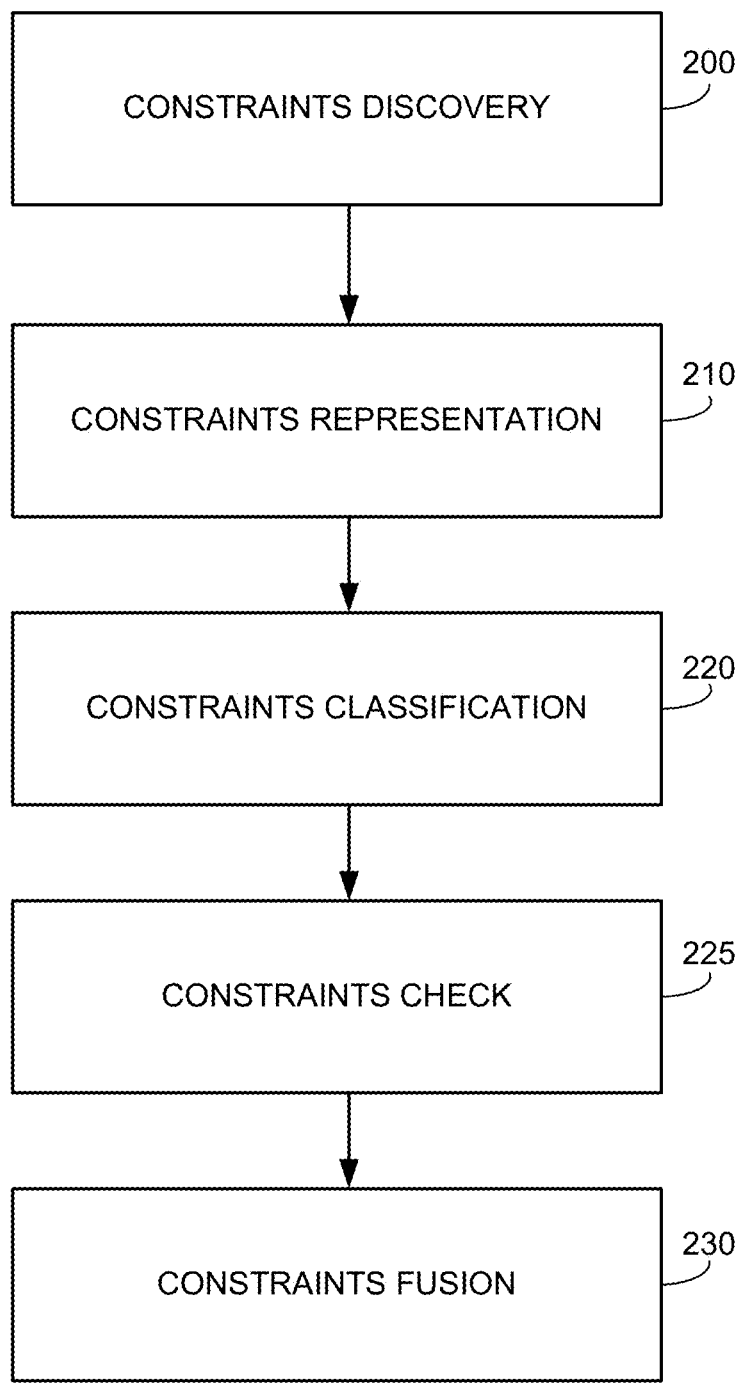
FIG. 2A is a flow chart of the constraints management process of the method, according to an exemplary embodiment of the present disclosure.

FIG. 2A is a flow chart of the constraints management process of the method. In block 200 of the constraints management process, the constraints utilized in server consolidation are discovered. The constraints discussed above are some of the common constraints utilized in server consolidation, although many more exist in practice. These constraints represent various expectations of server consolidation from different perspectives, including system performance, reliability, security, energy, maintenance, business, and so on. While some constraints can be directly specified by the system operators, a number of constraints can be discovered from system log and configuration files.

Given a number of constraints, a consistent way to represent them is needed so that they can be well utilized in the consolidation process. It has been observed that most constraints can be translated into a set of dependencies between the consolidated applications. For example, the "memory sharing constraint" can be expressed as the preference of allocating application pairs into the same machine based on their similarity of memory images. Similarly, the "security constraint" usually specifies a list of application pairs that should not be placed in the same machine. Therefore, in block 210 of the constraints management process, the constraints are described or represented using application affinity matrix $A \in R^{n \times n}$, where n is the number of applications to be consolidated, to describe each constraint c, in which the (i, j)th entry $A_{ij}$ represents the preference of placing applications $a_i$ and $a_j$ in the same physical machine according to the constraint c. The value $A_{ij}$ ranges from −1 to 1, with the positive values representing the preference or agreement of placing two applications into the same machine, and the negative values denoting the opposition to collocating two applications.

In block 220 of the constraints management process, the affinity matrices are classified into multiple difference types based on the strictness of constraints. It has been observed that while some constraints, such as the security and privacy constraints, must be enforced during the consolidation, some constraints only provide certain degree of preferences about placing the applications. In order to differentiate the soft and hard constraints, the method divides affinity matrices into multiple types.

One type of affinity matrix is the "must be" affinity matrix. The values of the "must be" matrix entries are either 1 or 0. The entry of the 1 value represents that the two related applications must be placed together, and the entry of the 0 value does not contain any expectations.

Another type of affinity matrix is the "should not be" affinity matrix. The "should not be" matrix has entries with the value either −1 or 0. While the entry the −1 value indicates that two related applications should not be placed together, the entry of to 0 value does not contain any expectations.

A further type of affinity matrix is the "can be" affinity matrix. The "can be" affinity matrix represents the soft preferences of allocating applications, with the value of each entry between −1 and 1.

Figure 3:
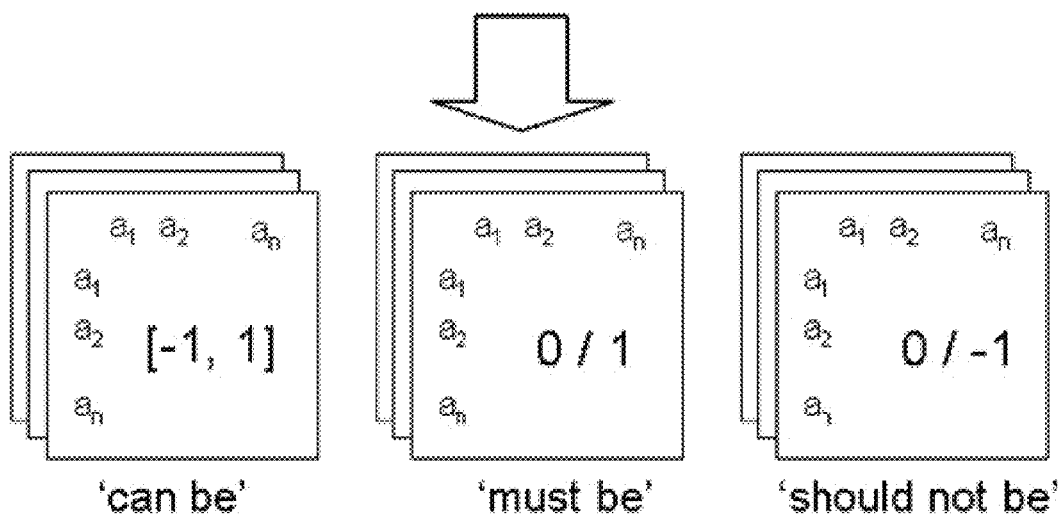
FIG. 3 is a graphical representation of consolidation constraints.

Each constraint can be characterized by a specific affinity matrix belonging to one of the above or other types. As shown in FIG. 3, given a number of constraints $c_1, c_2 \ldots, c_k$, multiple sets of affinity matrices can be obtained, representing, for example, the "must be," "should not be," and "can be" constraints respectively. The matrix classification is performed because each type of matrices will function in its own way in the consolidation process. While the method has to obey the hard constraints in the consolidation, the soft "can be" constraints can only be satisfied with best efforts.

In practice there may exist some conflicts in the consolidation constraints. For example, some application pairs may be specified in both the "must be" and "should not be" matrices. The method can identify those conflicts by checking in block 225, all the constraints before the consolidation. The constraint check process determines whether there are conflicts between hard constraints. That is, if an application pair is labeled as both "should not be" and "must be" constraints, an alert will be generated. The constraint check process determines the condition that the summation of resource demand for applications, that "must be" placed together, should be less than the capacity of physical machine. Otherwise no machine can host that group of applications. For example, if the aggregated resource demands of a set of applications, which must be placed together based on the constraints, exceeds the resource capacity of any physical machine, the method can recognize the situation and output alerts before the consolidation process. The method, however, does not resolve those conflicts during the consolidation. Instead, the method discovers or identifies all those violations and then asks the system operator to handle them.

In practice, a large number of affinity matrices that represent various constraints for server consolidation may be encountered. If the original constraints are directly used to perform application placement, the placement algorithm has to frequently check those affinity matrices one by one in order to generate a feasible solution. Therefore, in block 230 of the constraints management process, a constraint fusion process is used to combine the affinity matrices. As a result, a small number of affinity matrices can be obtained to represent the original constraints. By using the compact constraints representation to guide the application placement, the placement algorithm can be more efficient.

The constraint fusion is performed on each type of the affinity matrices separately. For the hard constraints, e.g., the "must be" and "should not be" affinity matrices, their combination is relatively simple because the original constraints have to be all satisfied in the combined output. For example, the entry value of the combined "must be" matrix is 1 only when at least one of the original "must be" matrices have a non-zero value in that entry. Similarly, as long as one of the original "should not be" matrices has non-zero value in one entry, the value −1 for that entry is set in the combined "should not be" matrix.

The combination of the "can be" constraints is not straightforward because those constraints are represented as real value matrices reflecting the various degree of preferences for the consolidation. In addition, the affinity matrices are usually originated from different sources, each of which has its own criteria to specify the preferences. Therefore, in one embodiment, a weighted average is used to combine the "can be" matrices. A weight $\alpha_i$ is assigned to each "can be" affinity matrix to differentiate the importance of those soft constraints, where $\Sigma_{i=1}^{K} \alpha_i=1$ and K is the total number of "can be" affinity matrices. Equation (2) below shows that that the large value of $\alpha_i$ reflects the high importance of its related affinity matrix during the consolidation. The weight values can be specified by the system operators based on their knowledge about the sources of various constraints.

In addition to distinguishing various affinity matrices, the values of each entry in the affinity matrix is also considered during the constraint fusion. This is because those soft preferences in the "can be" matrices usually contain ambiguities, and the level of ambiguity varies based on the value of each entry in the matrix. Entry values that are close to −1 or 1, contain little ambiguities because of the strong preferences expressed by those values. On the other hand, entry values close to 0 may contain high ambiguities. If, in the server consolidation, the entry values are treated in a same way, the strong preferences may be buried in many ambiguous suggestions. For example, suppose the affinities between the applications $\alpha_i$ and $\alpha_j$, are specified as $[C_{ij}^{(1)}, C_{ij}^{(2)}, \ldots, C_{ij}^{(10)}=[-0.9, 0.1, 0.1, 0.1 \ldots 0.1]]$ in 10 original "can be" matrices, in which only one constraint strongly suggests that such an application pair should be separated (with the value −0.9), and the other constraints present a weak value 0.1. In this example, if those values are averaged, the final entry value 0 will be obtained for applications $\alpha_i$ and $\alpha_j$, which is not expected because such an outcome ignores the first strong suggestion of −0.9 in the combination. In order to highlight these strong suggestions, a weight $w_{ij}$ is applied to each entry $C_{ij}$ in every "can be" matrix. The value of $w_{ij}$ can be determined by the entry value $C_{ij}$, using the following Biweight function $$w_{ij}=1-(1-C_{ij}^2)^3; -1<C_{ij}<1. \quad (1)$$

Figure 4:
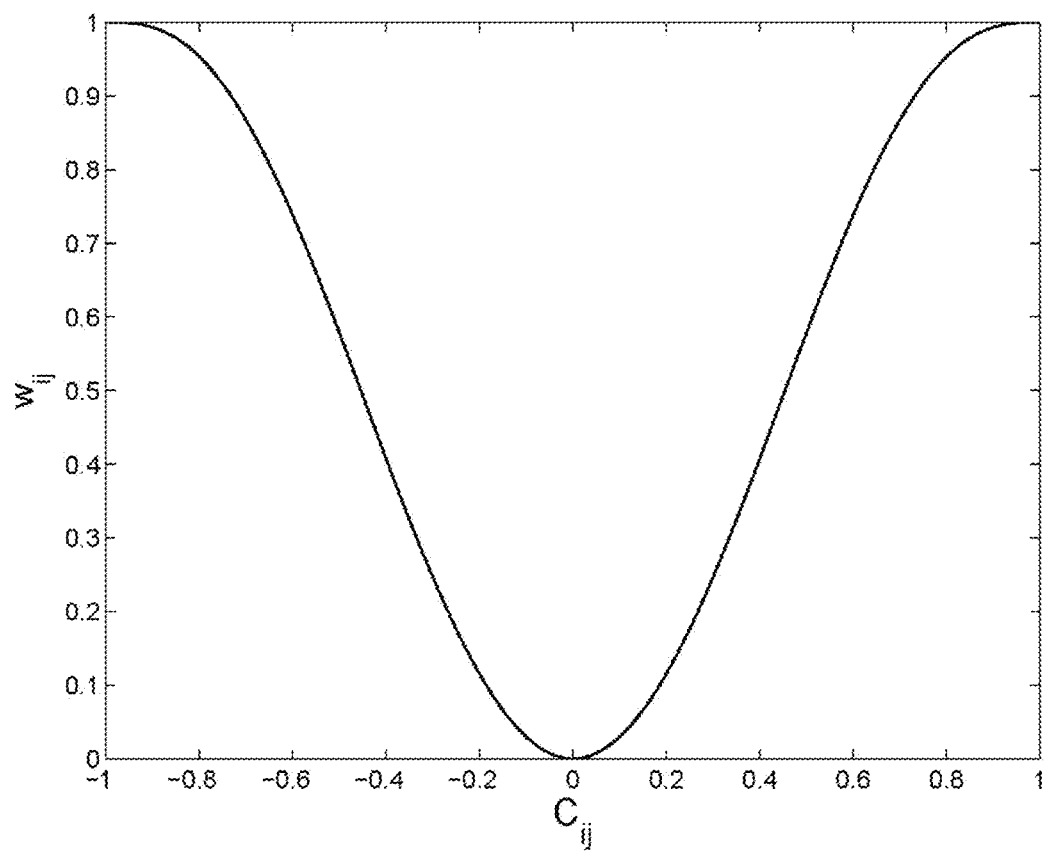
FIG. 4 is a plot of a Biweight function, which is used for determining the weight for each entry in the "can be" affinity matrix.

FIG. 4 plots the curve of the Biweight function, which function is used for determining the weight for each entry in the "can be" affinity matrix. As we can see, the weight values are high for the matrix entries with high absolute values, and are low for those entries with low absolute values.

Based on the above considerations, given K "can be" affinity matrices, $C^{(1)}, C^{(2)}, \ldots, C^{(K)}$, the combined output matrix C will have the following value in its $(i,j)^{th}$ entry $$C_{ij}=\alpha_1 w_{ij}^{(1)} C_{ij}^{(1)} + \alpha_2 w_{ij}^{(2)} C_{ij}^{(2)} + \ldots + \alpha_K w_{ij}^{(K)} C_{ij}^{(K)} \quad (2)$$

where $\alpha_i, \ldots, \alpha_K$ represent the weights for differentiating the affinity matrices, and $w_{ij}^{(k)}, k=1, \ldots, K$ denotes the weight for the (i, j)th entry in the affinity matrix $C^{(k)}$. After constraint fusion, the output matrix C can be renormalized to make sure the values of all entry values are within the range between −1 and 1.

Application Placement

FIG. 2B is a flow chart of the application placement process of the method. The application placement process includes an optional application grouping process in block 240 and application placement process in block 250. The optional application grouping process 240 is used to speed up the application process 250 when there are a large number of applications.

There are two separate goals in the application placement process 250. The first goal comes from the perspective of resource saving. Applications are to be allocated into a minimal number of machines based on each application's resource demand and the machine's capacity. By doing so, maximal energy spending savings can be achieved as well as the hardware cost. The second goal of application placement comes from the various constraints discussed above. The consolidation solution should comply with those constraints in order to make the system more reliable, stable, and easy to manage.

Based on the above goals, an objective function is used to guide the search for optimal application placement. Given n applications, we denote the resource demand of each application $\alpha_i$ as $\psi_i=[\psi_{i1}, \psi_{i2}, \ldots, \psi_{iR}]$, where $\psi_{i*}$ corresponds to one of the R types of resources such as CPU, memory, disk, network bandwidth and so on. Similarly, the resource capacity of each of the m physical servers is represented as $\Theta=[\theta_1, \theta_2, \ldots, \theta_R]$. An n×m binary matrix X is used to describe the application placement solution, in which the (i, k)th entry $x_{ik}$ describes whether the application $\alpha_i$ should be placed in the kth machine ($x_{ik}=1$) or not ($x_{ik}=0$). Since each application can be placed in only one physical machine, the result is $\Sigma_{k=1}^{m} x_{ik}=1$, for i=1, 2, . . . , n. An m dimensional binary vector y is also used to describe the status of each physical server, in which the kth element $y_k=1$ denotes the kth server is turned on and $y_k=0$ expresses the "off" status of that machine. Based on the above notation, the first goal of application placement is achieved by finding a matrix X that requires a minimal number of machines to host applications $$\min \sum_{k=1}^{m} y_k \quad (3)$$

under the condition that all application's resource demands are satisfied by the server capacity, $\Sigma_{i=1}^{n} x_{ik}\psi_i \leq y_k\Theta$, for k=1, 2, . . . , m.

As stated earlier, the second goal of application placement relates to the compliance of various constraints. Here we use different strategies to handle the various types of constraints. The "should not be" constraints are examined during the applications placement process. That is, when one application is allocated to a machine, it first determined whether there are any conflicting applications already resident in that machine, based on the specifications in the "should not be" affinity matrix. If a conflicting application is found in that machine, it is skipped and other machines are evaluated for placement of that application.

The "must be" affinity matrix or constraints are handled prior to the application placement. According to the "must be" matrix, those applications that must be placed in the same machine are combined, and a new application is used to represent them in the placement process. The resource demand of that new application is equal to the summation of demands of all combined applications, and its affinity values with other applications equal to the average affinities of its source applications with other applications. Specifically, the applications that obey the "must be" constraint are combined into a virtual application. The real application has two features: 1) the resource demand and 2) the affinity with other applications. The virtual application requires the same two features as the real application, to be treated in the same way in the consolidation. In order to achieve this result, the method defines: 1) the resource demand of the virtual application as being equal to the summation of demands of all combined applications, and 2) the affinity values between the virtual application and other applications as being equal to the average affinities of its source applications with other applications.

In the placement process, only the newly generated application is considered rather than the original applications separately.

Unlike the "must be" and "should not be" constraints, the "can be" constraints or affinity matrix C represents the soft preferences for allocating the applications. Applications with high affinities should be allocated into the same machine and separated from application with low affinity scores. Such a placement objective can be described as maximizing the aggregated (combined) affinity scores for all applications collocated in each machine $$\max \sum_{k=1}^{m} \left\{ \sum_{i=1}^{n} \sum_{j=i+1}^{n} x_{ik} x_{jk} C_{ij} \right\}. \quad (4)$$

A high aggregated affinity score reflects a better compliance with the "can be" constraints. However, since the first placement goal, expressed in equation (3), is described in a minimization framework, equation (4) is rewritten into the following equation $$\min \sum_{k=1}^{m} \left\{ \sum_{i=1}^{n} \sum_{j=i+1}^{n} x_{ik} x_{jk} (1 - c_{ij}) \right\}, \quad (5)$$

where $(1-C_{ij})$ is used to describe the disagreement between two applications when they are allocated in the same machine. The disagreements or level of conflicts between every application pair, $\alpha_i$ and $\alpha_j$, that are collocated in the machine k, i.e., $x_{ik}=x_{jk}=1$, are summarized, and the method attempts to minimize such function during the application placement. By doing so, those applications with high affinity values are encouraged to be placed in the same machine, and those applications with low affinity values are separated.

Combining the two objectives described in equations (3) and (5), the final objective function is obtained is equation (6) for application placement $$\min \left\{ \sum_{k=1}^{m} y_k + \lambda \sum_{k=1}^{m} \left\{ \sum_{i=1}^{n} \sum_{j=i+1}^{n} x_{ik} x_{jk} (1 - C_{ij}) \right\} \right\}. \quad (6)$$

The parameter $\lambda$ determines the importance of each objective in the placement solution. In one embodiment, parameter $\lambda$ is set to 1. The parameter $\lambda$ can be set to other values in other embodiments, to balance the importance of each objective.

If each application is regarded as an item and each machine as a bin, the task of application placement corresponds to the traditional bin packing problem, for which no shortcut or smart algorithm is possible that would lead to the optimal solution. Instead of using some exhaustive analysis to find the optimal solution, some human-designed heuristics, such as the first fit decreasing (FFD) and the best fit decreasing (BFD) algorithms, are frequently adopted to find the near optimum solution for bin packing. However, those heuristics only focus on the minimization of the number of machines, and have not considered the various constraints in application placement. If traditional heuristics are relied on to search the optimal solution for the objective function of equation (6), the final output may be far from the desired optimum because it does not reflect the second objective of equation (5). Therefore, a new heuristics design is required for the multiple objectives optimization. However, it is difficult to manually discover those new heuristics because the solution space of the problem is much more complex than that of traditional bin packing. Therefore, the application placement process of block 250 can be performed in one embodiment using an evolution based algorithm which searches for the optimal placement solution. The evolution algorithm allows the design of effective heuristics to be automated via evolutions. As a consequence, the evolution algorithm can achieve better placement results than the traditional heuristics based methods.

Figure 5:
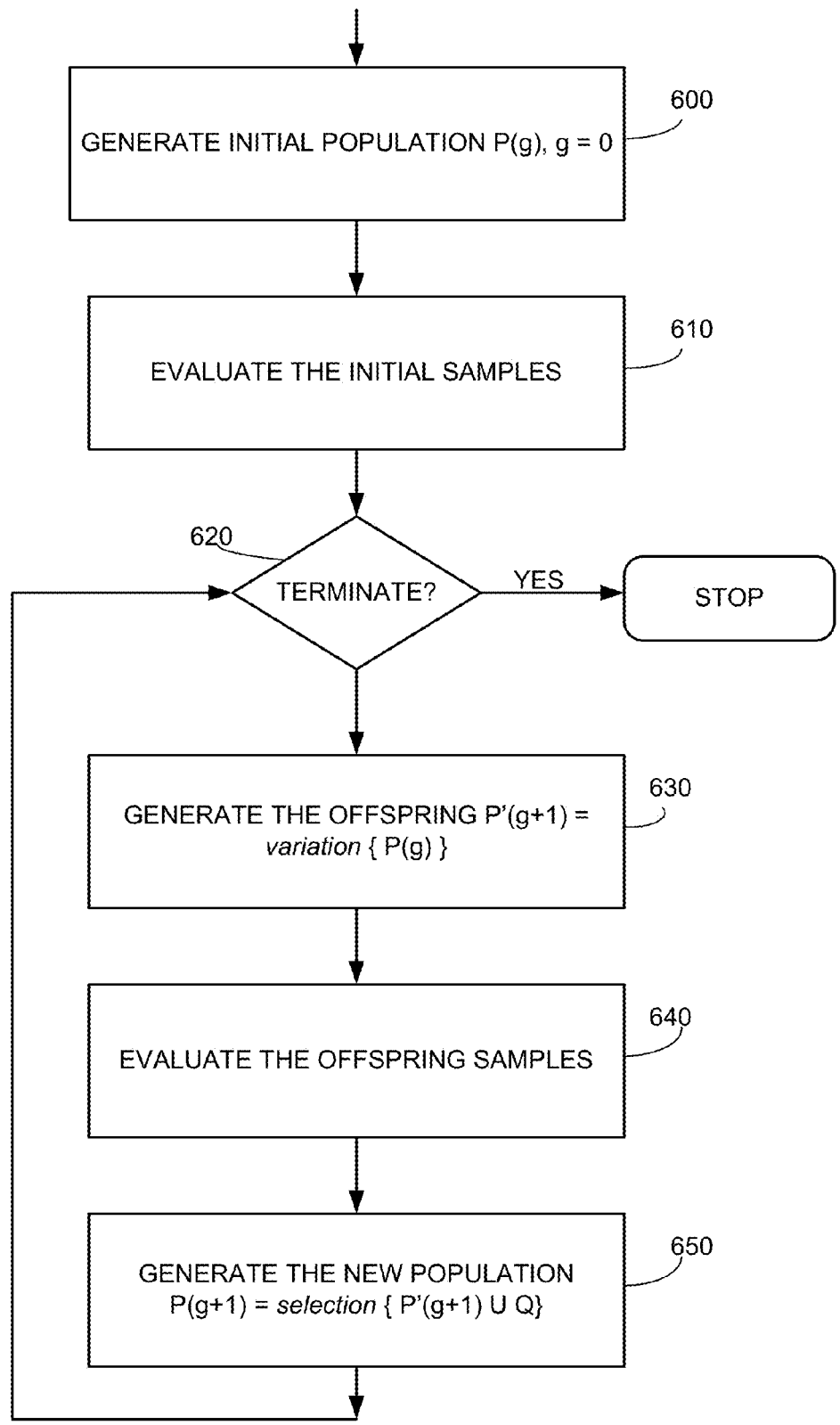
FIG. 5 is a flowchart depicting an evolution based placement search algorithm according to an exemplary embodiment of the present disclosure.

FIG. 5 is a flowchart depicting the evolution based placement search algorithm. Each placement solution is regarded as one sample, and P(g) is used to denote a population of μ placement solutions at generation g. For each placement solution, the method computes the value of the objective function of equation (6). The evaluation of population is to compute the objective function value for every candidate placement solution in the population. Thus, in block 600 of the flowchart of FIG. 5, an initial population of placement solutions P(g) (population P(g)) is generated, and in block 610, the population P(g) is evaluated. In block 620, a determination is made whether to terminate the process. The process is terminated in block 622 if: 1) the objective function in equation (6) generated by several consecutive populations shows very close values (converges); or 2) a certain amount of time budget has been reached. The process continues on to block 630 if 1) the consecutive populations have not shown the convergence behavior of the objective function (6); AND 2) there is still time budge available to proceed. The offspring P'(g+1) of size λ of population P(g), is generated in block 630 by using a variation operator on the population P(g). The offspring P'(g+1) contains new placement solutions which need to be evaluated. The objective function (placement solutions) of each offspring sample in offspring P'(g+1) is evaluated in block 640. After evaluating the objective function for each individual offspring sample in offspring P'(g+1), the evolutionary algorithm generates a new population of placement solutions in block 650, i.e., (g+1)th of population P(g+1), by selecting the best samples from the union of the offspring P'(g+1) and the previous population P(g). In the placement process, a good sample corresponds to a placement solution that can bring a low objective value specified in the function of equation (6). By designing appropriate "variation" and "selection" operators, the iterative process of the evolution algorithm of FIG. 5 will converge to the optimal placement solution.

In the evolution based placement search, each placement solution is represented as, $$P: \{\{\alpha_1, \alpha_3\} \{\alpha_2, \alpha_5\} \{\alpha_4, \alpha_6\}\}. \quad (7)$$

Equation (6) contains a number of application sets, each of which describes the list of applications that are collocated in the same machine. Note that each application appears in one and only one application set, and the aggregated resource demand for those applications in the same set should not exceed the capacity of the physical machine. The total number of application sets in the representation P equals to the number of physical machines required to host those applications.

Referring still to FIG. 5, based on such a representation, each initial placement solution of block 600 can be generated by randomly selecting an application $\alpha_1$ from a given pool of unallocated applications and then allocating it into an empty machine. The application $\alpha_1$ is selected in a probabilistic manner to make sure that those applications with large resource demands are more likely to be selected first. Other applications are selected from the given pool of unallocated application and located into $\alpha_i$'s machine. Probabilistic application selection is used for selecting the other applications also so that applications that have high affinities with $\alpha_i$ and high resource demands get more chances to be selected as $\alpha_i$'s neighbor. The selected applications are allocated into the $\overline{\alpha_i}$'s machine until there are no free capacities in that machine to host more applications. This process is repeated until the given pool of unallocated applications is empty. During allocation of an application into a machine, the "should not be" constraint matrix is checked to see whether there are conflicting applications already in that machine. If so, the current placement action is withdrawn, i.e., the application is placed back into the given pool of unallocated applications for future selections. The placement generation is performed μ times, and the μ placement solutions are used as the initial population. Note rather than the uniform random sampling, a large amount of information is utilized, such as the applications' resource demands and the affinities between applications, to guide the generation of initial placement solutions. By doing so, the generated initial samples can be located closely to the underlying optimum in the placement space, and thus the evolutionary process can have high chances to quickly converge to the optimal solution.

After the evaluation of population P(g) in block 610, the variation operator is applied to population P(g) in block 630 to get its offspring P'(q+1). In one embodiment, the variation operator includes a mutation operator and a recombination operator. While the goal of recombination is to share the information from previous populations so that the prior knowledge about the structure of search space can be preserved, the mutation is to add some randomness into the new population so that the search process can have more chances to explore new structures in the search space.

Figure 6A:
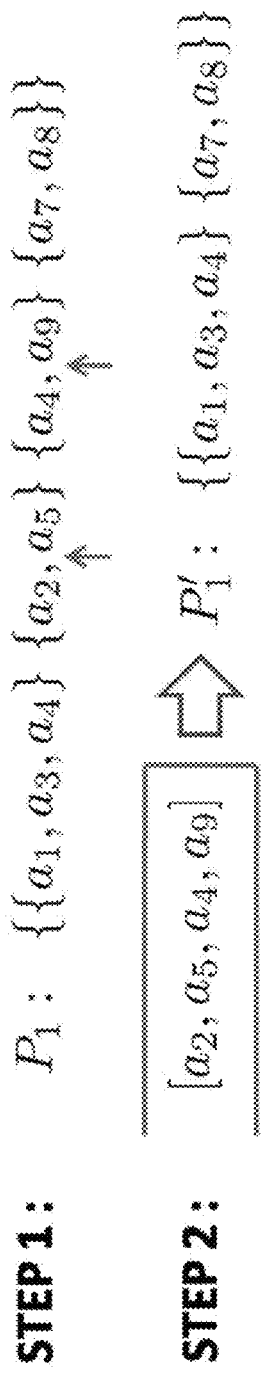
FIG. 6A illustrates the operation of a mutation operator, according to an exemplary embodiment of the present disclosure.

FIG. 6A illustrates the mutation operator. Given a placement solution $P_1$, some application sets that need to be mutated are randomly selected in step 1. The arrows shown in FIG. 6A denote the selected application sets. The selected sets are removed from placement solution $P_1$, and the applications in the removed sets are placed into a queue. In step 2, the queued applications are allocated into a modified placement solution $P'_1$. The allocation is performed by sorting the applications in the queue by their resource demands, and selecting the applications one by one from high to low demands. For each selected application $\alpha_i$, a search is performed to find the ideal machine for that application, i.e., a search of an appropriate application set in $P'_1$, to host the selected application. The aggregated affinity between the selected application $\alpha_i$ and all the applications in each machine in $P'_1$ is calculated, and then the machines are each scanned from high affinity to low values. If there is a machine that has enough free resource to host selected application $\alpha_i$, the selected application $\alpha_i$ is placed into to that application set. Otherwise we turn on an empty machine, i.e., add a new application set in $P'_1$, to host $\alpha_i$. Once all applications in the queue have been placed, a mutated placement from the original solution $P_1$ is obtained.

Figure 6B:
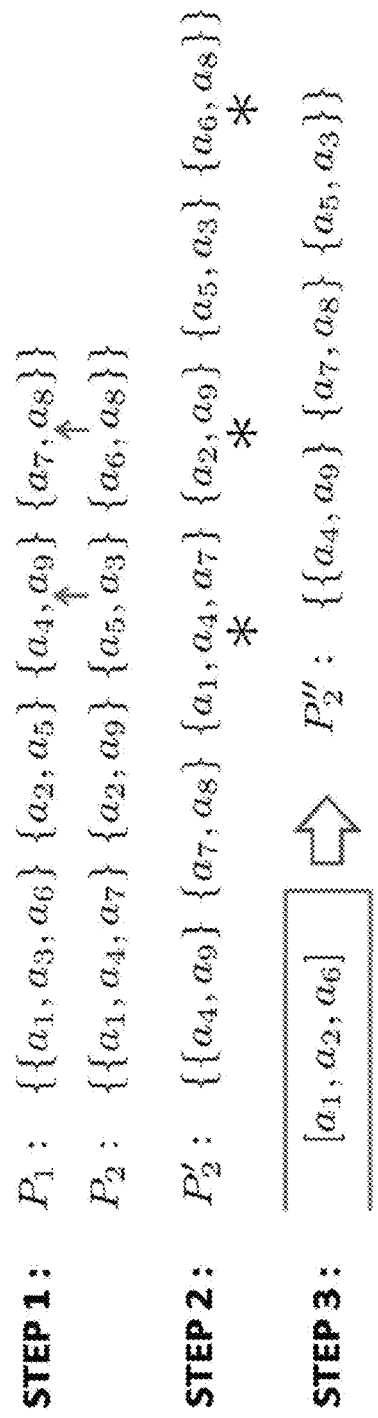
FIG. 6B illustrates the operation of a recombination operator, according to an exemplary embodiment of the present disclosure.

FIG. 6B illustrates the recombination operator. The recombination operator is performed simultaneously with the mutation operator. However, unlike the mutation operator, which is performed on a single placement solution, the recombination operator is conducted on two placement solutions $P_1$ and $P_2$. In the first step of recombination, one of the two placement solutions $P_1$ and $P_2$ is randomly selected. In the example shown in FIG. 6B, placement solution $P_1$ is selected. Then, for each application set in placement solution $P_1$, the aggregated affinity is calculated for all application pairs in that set. Then some application sets with the highest aggregated affinities are selected, denoted by the arrows in step 1. The selected application sets represent the best sets in placement solution $P_1$, which are to be preserved in the recombination. In step 2, the selected application sets are inserted into the placement solution $P_2$ to generate an augmented solution $P'_2$. In that case, duplicated applications may be encountered in the augmented placement solution $P'_2$. We select those application sets in the original placement solution $P_2$ that contain overlapped applications with the inserted sets, and then remove those sets, denoted by "*," from augmented placement solution $P'_2$. After the removal of those sets, there are unassigned applications for modified placement solution $P''_2$. Those applications are placed into a queue in step 3, and used in the same way as in the mutation operator, to assign the queued applications into the modified placement solution $P''_2$. After all the queued applications have been assigned, the final placement is regarded as the output of the recombination between placement solutions $P_1$ and $P_2$.

Figure 7:
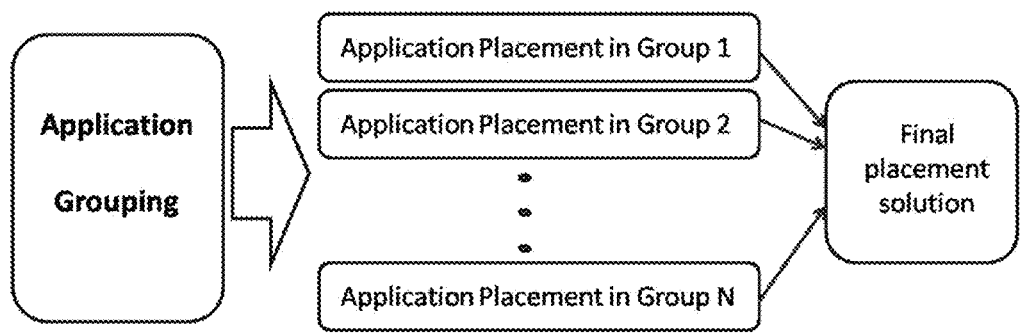
FIG. 7 illustrates an exemplary embodiment of the application grouping process.
Figure 8:
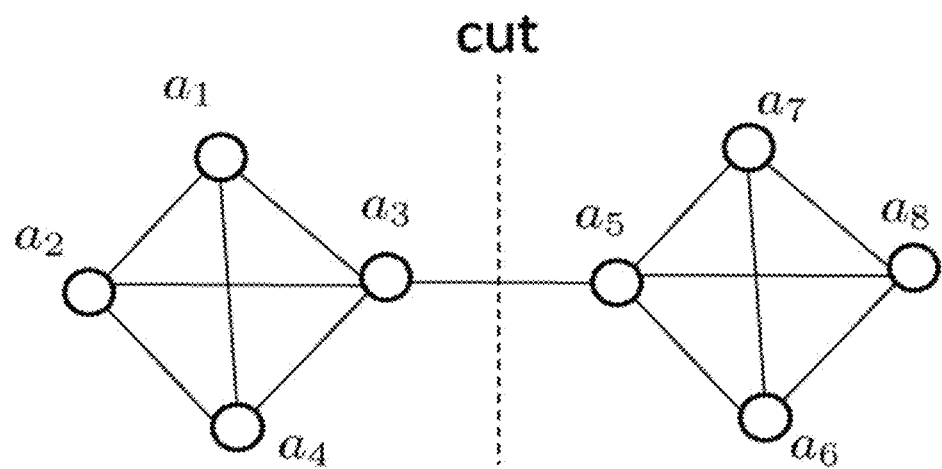
FIG. 8 illustrates the transformation of the application grouping process into a graph cut problem.

In the above two variation operators, the strength of mutation and recombination is determined by the number of application sets that need to be mutated or recombined, i.e., the number of arrows shown in FIGS. 7 and 8. In one embodiment, that number is randomly generated from a range of values between 5 and 10 percent of the total number of application sets in the related placement solution, under the condition of having a minimum value 1.

In the evolutionary search, the population size p=30 and offspring size μ=30 are selected. Among the offspring samples, half of them are generated by the mutation operator and the other half are produced by the recombination operator. While the mutation and recombination operators incorporate a lot of variations in the new sample generation, the (g+1)th population of solutions in the evolution always have better performance evaluations, with respect to the objective function (6), than previous populations. As a result, the search process is guided towards better regions in the solution space, and will eventually converge to the optimal placement that minimizes (6).

The search space of the application placement process grows exponentially with the number of applications. When there are a large number of applications involved in the consolidation, the efficiency of the evolution based search can be affected. This scalability issue can be solved, by performing the earlier mentioned application grouping process (block 240 of FIG. 2B), prior to performing the placement process (block 250 of FIG. 2B).

FIG. 7 illustrates one embodiment of the application grouping process. As illustrated therein, the applications are divided into several groups, and the evolution based search is performed in each application group separately. Since the search space of each sub-task is much smaller than the original solution space, the efficiency of placement search can be significantly increased. In addition, the application grouping process also provides an opportunity to perform the placement search in parallel. As illustrated in FIG. 7, parallel processing features of a multi-core architecture (multi-core CPUs) is used to conduct the placement search in each group simultaneously.

After application grouping, the final placement solution is obtained by aggregating the placement results in all the groups. Such a solution may not be equivalent to the original optimal solution obtained by searching the global solution space. However, such differences can be minimized if the segmented subspaces, represented by each group of applications, are orthogonal with each other. In order to achieve this, the applications should be divided in a manner that ensures that different groups of applications are as separate from one another as possible. Given, for example, the "can be" matrix that represents the affinities between applications, applications with high affinity values should be grouped together and separate from those with low affinity values. Note the hard constraints are not involved in the grouping process. The "should not be" affinity matrix is not considered because it only specifies that two applications should not be placed in the same machine, but still allows them to be in the same group. For the "must be" constraint, a new application is generated as described above to represent the original applications that "must be" located together, and use the new application in the grouping process instead of the original applications.

More specifically, given n applications $G=\{\alpha_1, \alpha_2, \ldots, \alpha_n\}$, the grouping process divides the applications into N groups, $G_1, G_2, \ldots, G_N$, with $G=\cup_{k=1}^{N} G_k$ and $G_k \cap G_2 = \emptyset$ for $k \neq 1$. The input of the grouping may be, for example, the "can be" affinity matrix generated from the constraint fusion process. The "can be" matrix can be formulated into a graph structure as illustrated in FIG. 8. A well known graph partition algorithm can be used to group the applications where each node in the graph represents one application, and each link represents the affinity between the associated applications based on the value in the "can be" matrix. Given such a graph, the goal is to cut it into several sub-graphs, as illustrated in FIG. 8, based on the strengths, i.e., affinities, associated in the node pairs. There are a number of well known graph partition algorithms which may be used, including without limitation, the minimum cut algorithm and the normalized cut algorithm. If the normalized cut algorithm is used to perform the graph partition, this algorithm attempts to minimize the average link ratio between each group $G_l$ and its complement $\overline{G}_l = G - G_l$ $$\min \frac{1}{N} \sum_{l=1}^{N} \frac{\text{link}(G_l, \overline{G}_l)}{\text{degree}(G_l)} \tag{8}$$

where the numerator in the objective function measures how many links escape from $G_l$ $$\text{link}(G_l, \overline{G}_l) = \sum_{i \in G_l, j \in \overline{G}_l} C_{ij} \tag{9}$$

and degree $(G_l)$ in the denominator represents the total connection from nodes in $G_l$ to all nodes in the group $$\text{degree}(G_l) = \text{link}(G_l, G). \tag{10}$$

In order to find the application grouping solution that minimizes equation (8), the input "can be" affinity matrix C is normalized and then the N largest eigenvectors of the normalized matrix are determined. The eigenvectors can be used to represent the original data. That is, each application $\alpha_i$ can be represented as a N dimensional vector corresponding to the ith entries in the eigenvectors. A well known clustering method is used on the newly represented data to divide the n applications into N groups. Such a know clustering method can include, without limitation, the k-means clustering method.

One of the immediate application of method of the present disclosure is a cost estimation model for cloud computing. With the appearance of cloud computing, more and more organizations are now considering moving their in house IT structure to a public or private cloud in order to save power and management coast. Organizations may, however, be hesitant to move their IT infrastructures into clouds because it is difficult to accurately estimate the costs of moving. Specifically, such costs are determined by a number of factors including the size of application instances, the inbound and outbound network traffic, and so on. The method of the present disclosure can serve as a consolidation tool for system administrators to obtain accurate cost estimations.

Figure 9:
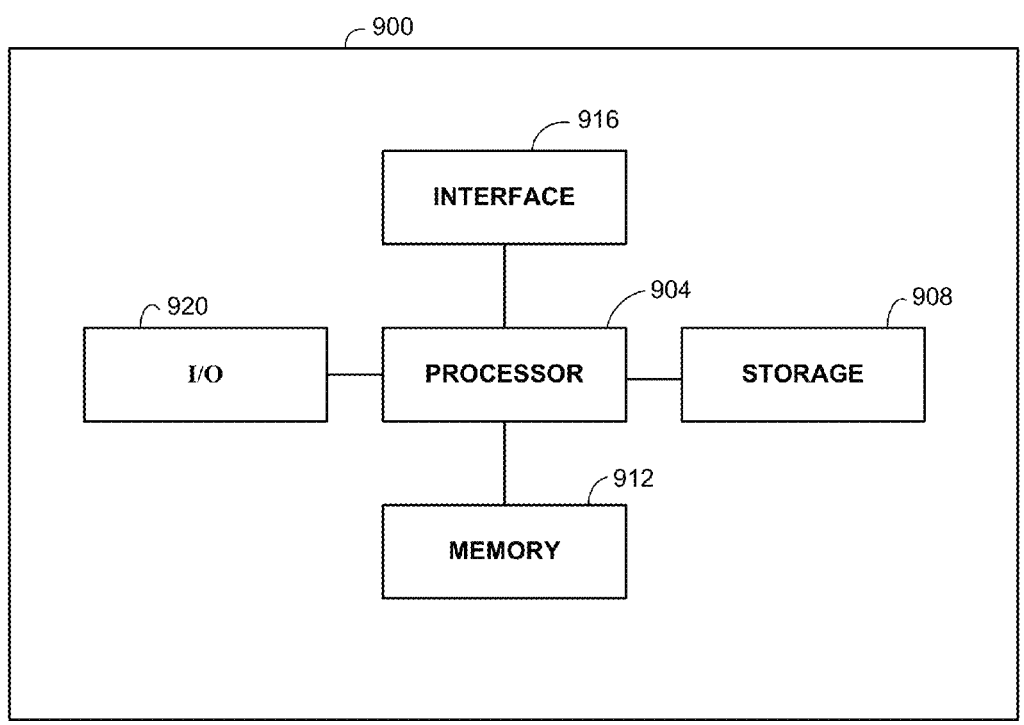
FIG. 9 is a block diagram of an exemplary embodiment of a computer apparatus which is programmed with instructions for enabling the apparatus to perform the virtualization and consolidation analysis engine or method of the present disclosure.

The methods of the present disclosure may be performed by an appropriately programmed computer apparatus, the configuration of which is well known in the art. An appropriate computer apparatus may be implemented, for example, using well known computer processors, memory units, storage devices, computer software, and other modules. A block diagram of a non-limiting embodiment of the computer apparatus is shown in FIG. 9 and denoted by reference numeral 900. The computer apparatus 900 includes, without limitation, a processor 904 which controls the overall operation of computer apparatus 900 by executing computer program instructions corresponding to the virtualization and consolidation analysis engine or method of the present disclosure. The computer program instructions can be stored in a storage device 908 (e.g., magnetic disk) and loaded into memory 912 when execution of the computer program instructions is desired. The computer apparatus 900 further includes one or more interfaces 916 for communicating with other devices (e.g., locally or via a network). The computer apparatus 900 still further includes input/output 920 which represents devices which allow for user interaction with the computer apparatus 900 (e.g., display, keyboard, mouse, speakers, buttons, etc.).

One skilled in the art will recognize that an actual implementation of a computer apparatus executing computer program instructions corresponding to the virtualization and consolidation analysis engine or method of the present disclosure, can also include other elements as well, and that FIG. 9 is a high level representation of some of the elements of the computer apparatus for illustrative purposes. Further, a computer apparatus executing computer program instructions corresponding to the virtualization and consolidation analysis engine or method of the present disclosure, can be component of a larger apparatus or system. In addition, one skilled in the art will recognize that the method described herein may also be implemented using dedicated hardware, the circuitry of which is configured specifically for implementing the method. Alternatively, the method may be implemented using various combinations of hardware and software.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for consolidating a plurality of applications into one or more servers, the method comprising:
   organizing consolidation constraints in a computer process, the consolidation constraints representing preferences about placing applications into the one or more servers; and
   allocating the applications into the one or more servers in a computer process that maximally satisfies the consolidation constraints;
   wherein the organizing of the consolidation constraints includes:
      representing each of the consolidation constraints according to dependencies between consolidated applications, the dependencies being represented by application affinity matrices, each entry having a value representing the suitability of placing two applications selected from the plurality of applications on a same one of the one or more servers, the suitability controlled by a given one of the consolidation constraints, the values including positive values representing a preference for placing the two applications on the same server and negative values representing an opposition to placing the two applications on the same server, and
      classifying the application affinity matrices into a plurality of different classes each of the classes based on the strictness of the corresponding constraint.

2. The method according to claim 1, wherein the organizing of the consolidation constraints includes discovering the consolidation quality factors.

3. The method according to claim 2, wherein at least one of the consolidation constraints is discovered from resource utilization traces of the applications.

4. The method according to claim 1, wherein the application affinity matrices of one class are defined by an entry value which indicates that two of the applications must be placed together on a server.

5. The method according to claim 1, wherein the application affinity matrices of one class are defined by an entry value which indicates that two of the applications should not be placed together on a server.

6. The method according to claim 1, wherein the application affinity matrices of one class are defined by an entry value which indicates that two of the applications can be placed together on a server.

7. The method according to claim 1, wherein the organizing of the consolidation constraints includes combining similar classes of application affinity matrices to reduce the number of application affinity matrices.

8. The method according to claim 1, wherein the allocating of the applications into the one or more servers is performed with an evolution-based process.

9. The method according to claim 1, further comprising grouping the applications into a plurality of groups prior to the allocating of the applications into the one or more servers.

10. The method according to claim 1, wherein one or more of the applications is encapsulated in a virtual machine followed by an encoding scheme to represent the placement of virtual machine across physical machines.

11. An apparatus for consolidating a plurality of applications into one or more servers, the apparatus comprising:
   a processor executing instructions for:
      organizing consolidation constraints representing preferences about placing applications into the one or more servers; and
      allocating the applications into the one or more servers in a manner that maximally satisfies the consolidation constraints,
      wherein the organizing of the consolidation constraints includes:
         representing each of the consolidation constraints according to dependencies between consolidated applications, the dependencies being represented by application affinity matrices, each entry having a value representing the suitability of placing two applications selected from the plurality of applications on a same one of the one or more servers, the suitability controlled by a given one of the consolidation constraints, the values including positive values representing a preference for placing the two applications on the same server and negative values representing an opposition to placing the two applications on the same server, and
         classifying the application affinity matrices into a plurality of different classes each of the classes based on the strictness of the corresponding constraint.

12. The apparatus according to claim 11, wherein the organizing of the consolidation constraints includes discovering the consolidation quality factors.

13. The apparatus according to claim 12, wherein at least one of the consolidation constraints is discovered from resource utilization traces of the applications.

14. The apparatus according to claim 11, wherein the application affinity matrices of one class are defined by an entry value which indicates that two of the applications must be placed together on a server.

15. The apparatus according to claim 11, wherein the application affinity matrices of one class are defined by an entry value which indicates that two of the applications should not be placed together on a server.

16. The apparatus according to claim 11, wherein the application affinity matrices of one class are defined by an entry value which indicates that two of the applications can be placed together on a server.

17. The apparatus according to claim 11, wherein the organizing of the consolidation constraints includes combining similar classes of application affinity matrices to reduce the number of application affinity matrices.

18. The apparatus according to claim 11, wherein the allocating of the applications into the one or more servers is performed with an evolution-based process.

19. The apparatus according to claim 11, wherein the instructions for grouping the applications into a plurality of groups prior to the allocating of the applications into the one or more servers.

* * * * *